United States Patent [19]

Lee

[11] Patent Number: 4,824,161

[45] Date of Patent: Apr. 25, 1989

[54] AREA-VARIABLE AUTOMOBILE SUN VISOR

[76] Inventor: Chien-Li Lee, 9th Fl., No. 189, Chi Hsien Erh Rd., Chyan Chin District, Kaohsiung City, Taiwan

[21] Appl. No.: 116,384

[22] Filed: Nov. 3, 1987

[51] Int. Cl.⁴ .............................................. B60J 3/00
[52] U.S. Cl. ............................... 296/97.8; 296/97.12; 16/338; 160/370.2
[58] Field of Search ............... 296/97 G, 97 K, 97 R; 160/DIG. 3, 370.2; 16/337, 338 X

[56] References Cited

U.S. PATENT DOCUMENTS 2,667,222  1/1954  McCarthy et al. ............... 296/97 G
4,248,474  2/1981  Mandrick ........................ 296/97 G

FOREIGN PATENT DOCUMENTS 820386  11/1951  Fed. Rep. of Germany ... 296/97 G

Primary Examiner—Robert R. Song
Attorney, Agent, or Firm—Cushman, Darby & Cushman

[57] ABSTRACT

An automobile sun visor includes a vertical series of pivotally connected shield plates which are suspended from a horizontal hanging portion of a hanging rod mounted rotatably on a roof panel. The uppermost shield plate is mounted rotatably on the hanging portion. The shield plates are always in line with each other when unfolded. Each of the shield plates is formed with a slide slot in which a slide plate is received. The slide plates can be pulled to extend horizontally from the shield plates respectively. When the shield plates are all superposed on the uppermost shield plate one by one, they can be held together.

9 Claims, 5 Drawing Sheets

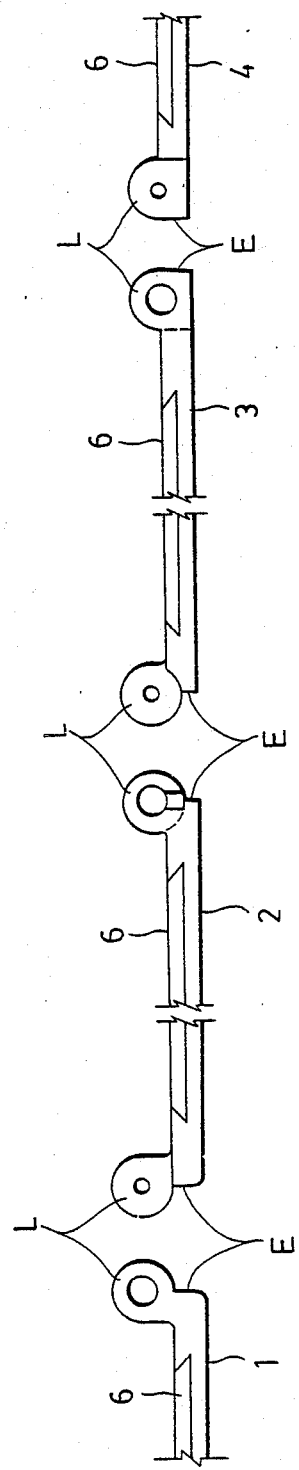
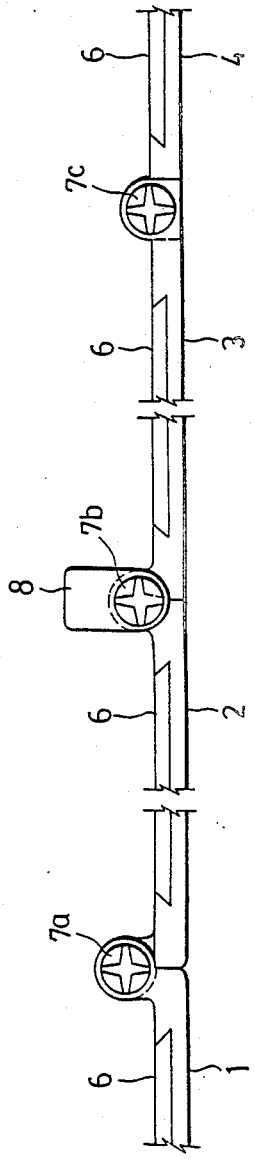

AREA-VARIABLE AUTOMOBILE SUN VISOR

BACKGROUND OF THE INVENTION

This invention relates to an automobile sun visor, and more particularly to an area-variable automobile sun visor which can be adjusted to increase its area in a biaxial direction.

When an automobile is being driven, a rotatable sun visor normally provided on a roof panel above the driver seat is rotated to a position adjacent to the windshield for shielding the driver's eyes from bright sunlight. The conventional sun visor is only used to perform this shielding function while the automobile is being driven. However, when an automobile is parked outdoors on a hot, sunny day, the interior of the automobile becomes very hot unless the windshield is shaded with an additional covering, e.g. carboard or cloth, etc. Especially, when an automobile is left sitting in the sun without such a windshield covering, the driver seat will be much too hot to sit down on comfortably. Although such coverings are effective for shielding the seat from the rays of sunlight, it is difficult to position them on the windshield. In addition, it is inconvenient to carry such coverings in an automobile.

SUMMARY OF THE INVENTION

It is therefore the main object of this invention to provide an area-variable automobile sun visor which can be adjusted to elongate in a biaxial director for shielding a major part of the windshield from sunlight.

According to this invention, an area-variable automobile sun visor includes a hanging rod, adapted to be mounted rotatably on a roof panel, having a horizontally extending hanging portion rotatable about a vertical axis; a vertical series of shield plates, any adjacent two of the shield plates being interconnected pivotally, the uppermost one of the shield plates being hung on the hanging portion of the hanging rod at its upper end so that the series of shield plates extends downwardly from the hanging portion; and means for holding the shield plates together when the shield plates are all superposed one by one on the uppermost shield plate. Each of the shield plates includes a slide slot formed therein, and a slide plate mounted slidably along the slide slot. The slide plates can be pulled to extend horizontally from the shield plates respectively.

BRIEF DESCRIPTION OF THE DRAWINGS

Other features and advantages of this invention will become apparent from the following detailed description of a preferred embodiment of this invention with reference to the accompanying drawings in which:

FIGS. 6 and 7 are schematic views illustrating the pivotal connection between any adjacent two of the shield plates of the area-variable automobile sun visor.

DETAILED DESCRIPTION OF THE PREFERRED EMBODIMENT

Figure 1:
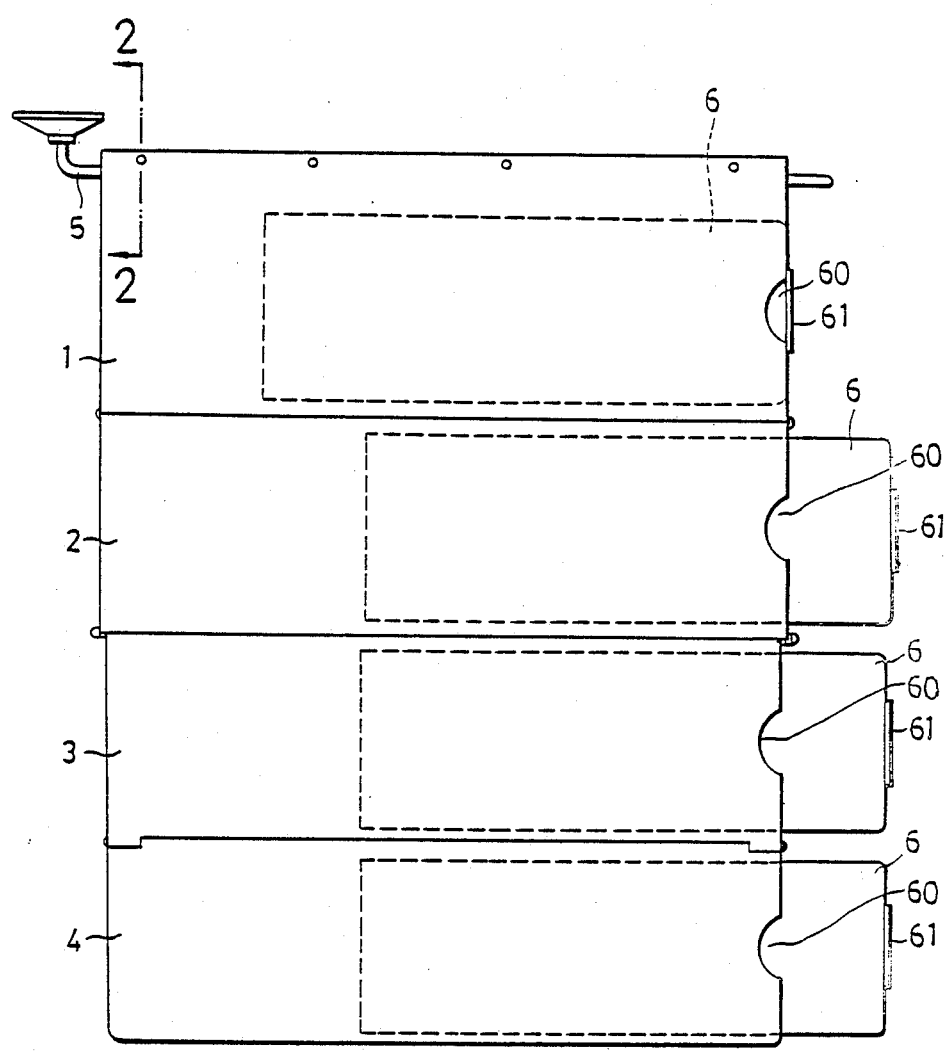
FIG. 1 is a rear view of an area-variable automobile sun visor in a longitudinally elongated position in accordance with this invention, in which three slide plates are extended partially.

Referring to FIG. 1, there is shown an area-variable automobile sun visor which includes a vertical series of four pivotally connected shield plates 1, 2, 3, and 4 suspended from a horizontal hanging portion of an L-shaped hanging rod 5. The L-shaped hanging rod 5 is mounted rotatably on the roof panel of an automobile in a known manner. Each of the shield plates 1 to 4 has a slide slot in which a slide plate 6 is received. Each of the shield plates 1 to 4 has an arcuate notch 60 in its open end. Each of the slide plates 6 is provided at its outer end with a lug 61 normally saddling the open end of the shield plate across the notch 60 so that the slide plate 6 can be easily pulled to extend horizontally from the shield plate by holding the lug 61 with fingers.

Figure 2:
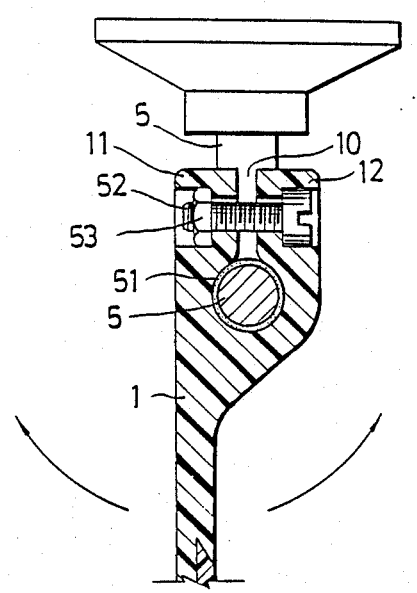
FIG. 2 is a sectional view taken along the line 2—2 of FIG. 1.

Referring to FIG. 2, the uppermost shield plate 1 is formed in its upper end surface with an open-ended slot 10 which is defined by two clamping walls 11 and 12. The open-ended slot 10 has an enlarged lower end for receiving the horizontal hanging portion of the hanging rod 5 therein. A resilient sleeve 51 is sleeved on the hanging portion of the hanging rod 5. The clamping walls 11 and 12 are pulled toward each other by threadably engaged lock bolt 52 and nut 53 for clamping tightly the hanging portion of the hanging rod 5 between the clamping walls 11 and 12. When the lock bolt 52 is loosened from the nut 53, the uppermost shield plate 1 can rotate about the hanging portion of the hanging rod 5.

Figure 4:
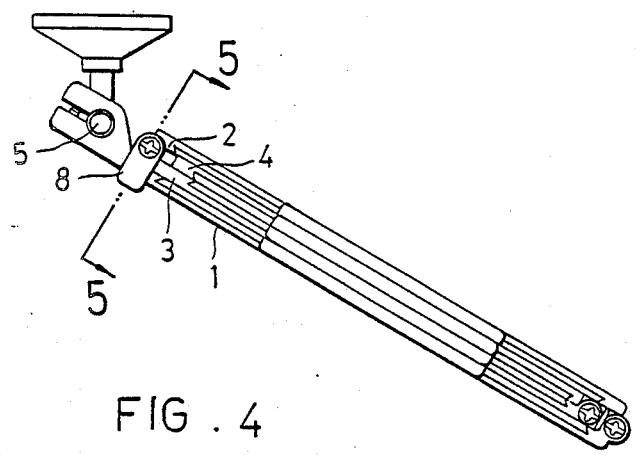
FIG. 4 is a side view showing the area-variable automobile sun visor in which three lower shield plates are all superposed one by one on the uppermost shield plate.
Figure 3:
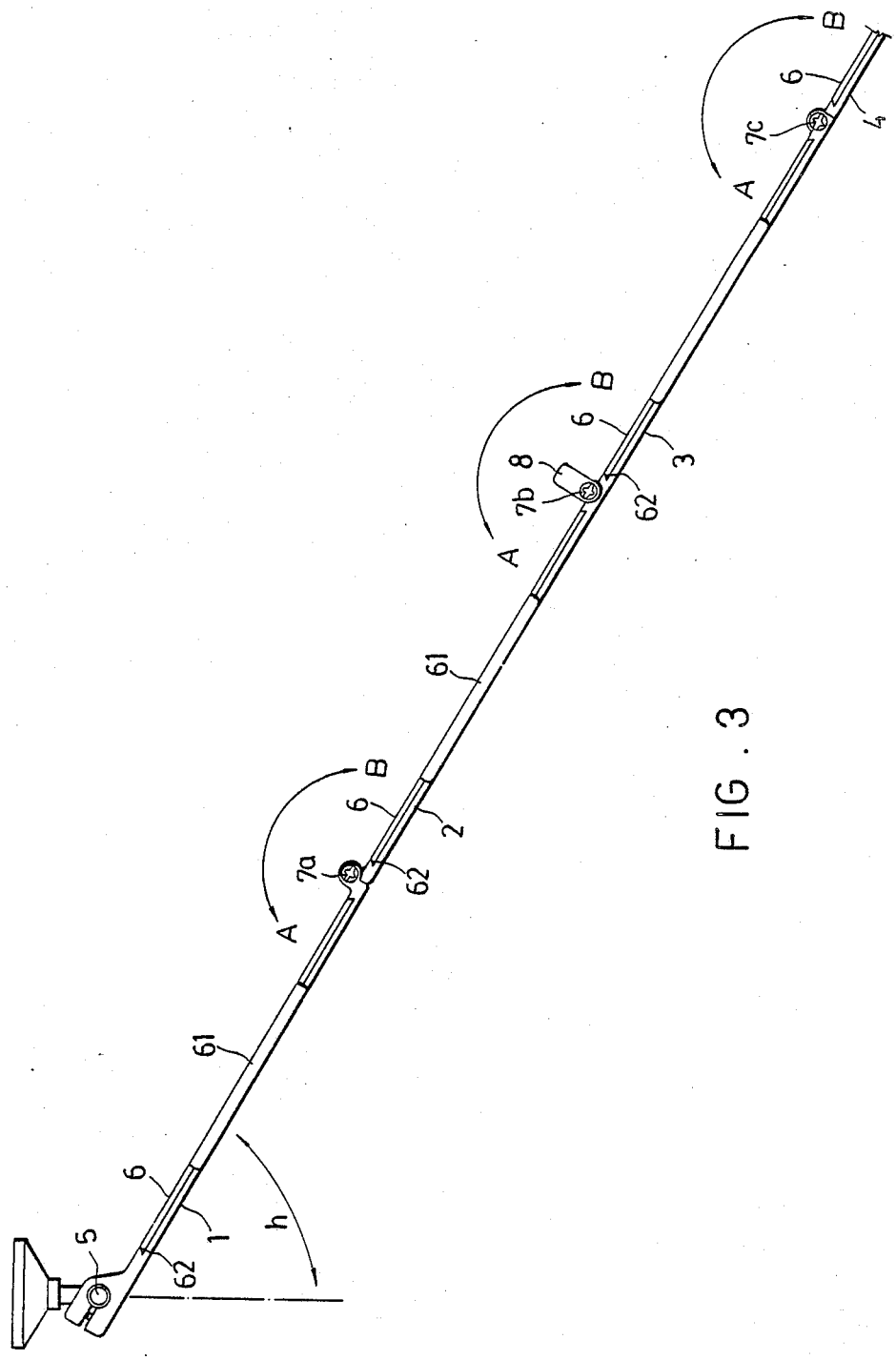
FIG. 3 is a side view showing the area-variable automobile sun visor which is rotated through an angle h about the hanging portion of a hanging rod.

Referring to FIG. 3, after the uppermost shield plate 1 is rotated through a desired angle h in accordance with the inclined angle of the windshield, it can be positioned relative to the hanging rod 5 by tightening the lock bolt 52 an the nut 53. In this embodiment, the slide slots of the shield plates 1 to 4 are dovetail grooves 62. Certainly, the slide plates 6 are of a dovetail shape conforming to the dovetail grooves 62. As illustrated, three pivot pins 7a, 7b, and 7c are respectively provided between the shield plates 1 and 2, between the shield plates 2 and 3, and between the shield plates 3 and 4. When in turn folding the shield plates 4, 3, 2, and 1 in a direction indicated by a first arrow A, the lower three shield plates 2, 3, and 4 can be superposed on the uppermost shield plate 1, as shown in FIG. 4. When unfolding the shield plates 1 to 4 in a direction indicated by a second arrow B of FIG. 3, the shield plates 1 to 4 can be restored to the original position shown in FIG. 3.

Figure 5:
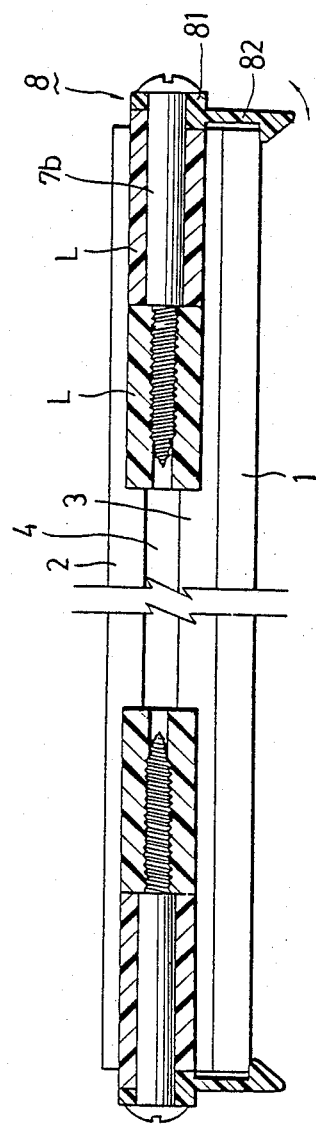
FIG. 5 is a sectional view taken along the line 5—5 of FIG. 4.

When the shield plates 1 to 4 are superposed, two resilient hooks 8 are respectively provided on two opposite sides thereof for holding them together. Each of the hooks 8, as shown in FIG. 5, is one piece including an annular portion 81 sleeved on the intermediate pivot pin 7b, and a holding portion 82 for holding the uppermost shield plate 1 thereon. When it is desired to unfold the shield plates 1 to 4, the holding portions 82 of the hooks 8 can be forced to release the uppermost plate 1 therefrom.

Referring to FIGS. 6 and 7, to pivotally connect the shield plates 1 to 4, each of the shield plates is provided at each end thereof with a flat end surface E, and a lug L having a central hole for insertion of the corresponding pivot pin therethrough. With the flat end surface E provided at each end of the shield plates, after the uppermost shield plate 1 is positioned on the hanging rod 5, the remaining shield plates 2 to 4 will be positioned relative to the uppermost shield plate 1. Accordingly, the shield plates 1 to 4, if desired, can be adjusted so that they are arranged in parallel with the inclined windshield, thereby promoting their sunlight shielding effect.

It is noted that two automobile sun visors of this invention may be respectively positioned over both the driver's side and the passanger's side of the front seat for permitting the slide plates to extend toward each other for shielding a major part of the windshield from sunlight.

When the automobile is being driven, the lower three shield plates 2 to 4 are all superposed on the uppermost shield plate 1 and the slide plates 6 are entirely retracted into the dovetail grooves 62 for functioning as a conventional automobile sun visor. When the automobile is stationary for a long time on a hot day, the shield plates 1 to 4 can all be unfolded and the slide plates 6 can be all pulled to extend from the shield plates so as to increase the area shaded by the sun visor.

With this invention thus explained, it is apparent that various modifications and variations can be made without departing from the scope and spirit of this invention. It is therefore intended that this invention be limited only as indicated in the appended claims.

I claim:

1. An area-variable automobile sun visor comprising:
   a hanging rod, adapted to be mounted rotatably on a roof panel and having a horizontally extending hanging portion rotatable about a vertical axis;
   a vertical series of shield plates, each adjacent pair of said shield plates being pivotally coupled together, an uppermost one of said shield plates being coupled to said hanging portion of said hanging rod along an upper edge thereof so that said series of shield plates extends downwardly from said hanging portion, said uppermost shield plate including in its upper edge surface and open-ended slot which is defined by two clamping walls interconnected at their lower ends for receiving said hanging portion of said hanging rod in a lower portion of said open-ended slot, a lock bolt extending through said clamping walls above said hanging portion, a nut engaged threadably with said lock bolt to an extent so that said hanging portion is clamped tightly between said clamping walls, whereby, when said lock bolt is loosened from said nut, said uppermost shield plate can be rotated about said hanging portion of said hanging rod; and
   means for holding said shield plates together when said shield plates are all superposed one by one on said uppermost shield plate.

2. An area-variable automobile sun visor as claimed in claim 1, wherein each of said shield plates includes a slide slot formed therein, and a slide plate mounted slidably along said slide slot, said slide plates being capable of being pulled to extend horizontally from said shield plates respectively.

3. An area-variable automobile sun visor as claimed in claim 2, wherein each of said slide plates includes a lug projecting from an outer side thereof for normally resting on corresponding side of said corresponding shield plate.

4. An area-variable automobile sun visor as claimed in claim 3, wherein each of said shield plates has in said corresponding side an arcuate notch having an opening which is aligned with said corresponding lug and which is of a width slightly smaller than that of said lugs, whereby, said slide plates can be easily pulled.

5. An area-variable automobile sun visor as claimed in claim 1, wherein said hanging portion of said hanging rod includes a resilient sleeve which is sleeved on said hanging portion for facilitating positioning of said uppermost shield plate on said hanging portion when said lock bolt and said nut engaged with said lock bolt are tightened up.

6. An area-variable automobile sun visor comprising:
   a hanging rod, adapted to be mounted rotatably on a roof panel and having a horizontally extending hanging portion rotatable about a vertical axis;
   a vertical series of shield plates, each adjacent pair of said shield plates being pivotally coupled together, an uppermost one of said shield plates being coupled to said hanging portion of said hanging rod along an upper edge thereof so that said series of shield plates extends downwardly from said hanging portion; and
   means for holding said shield plates together when said shield plates are all superposed one by one on said uppermost shield plate, said holding means including a hook having an annular portion adapted to be sleeved on a pivot pin connecting two adjacent shield plates for holding one of said shield plates adjacent to the other of said two adjacent shield plates.

7. An area-variable automobile sun visor as claimed in claim 6, wherein each of said shield plates includes a slide slot formed therein, and a slide plate mounted slidably along said slide slot, said slide plates being capable of being pulled to extend horizontally from said shield plates respectfully.

8. An area-variable automobile sun visor as claimed in claim 7, wherein each of said slide plates includes a lug projecting from an outer side thereof for normally resting on a corresponding side of said respective shield plate.

9. An area-variable automobile sun visor as claimed in claim 8, wherein each of said shield plates has in said corresponding side an arcuate notch having an opening which is aligned with said corresponding lug and which is a width slightly smaller than that of said lugs, whereby, said slide plates can be easily pulled.

* * * * *